Aug. 21, 1934.   F. GOUGH   1,970,696
APPARATUS FOR AUTOMATICALLY EQUALIZING BRAKES
Filed Jan. 15, 1934
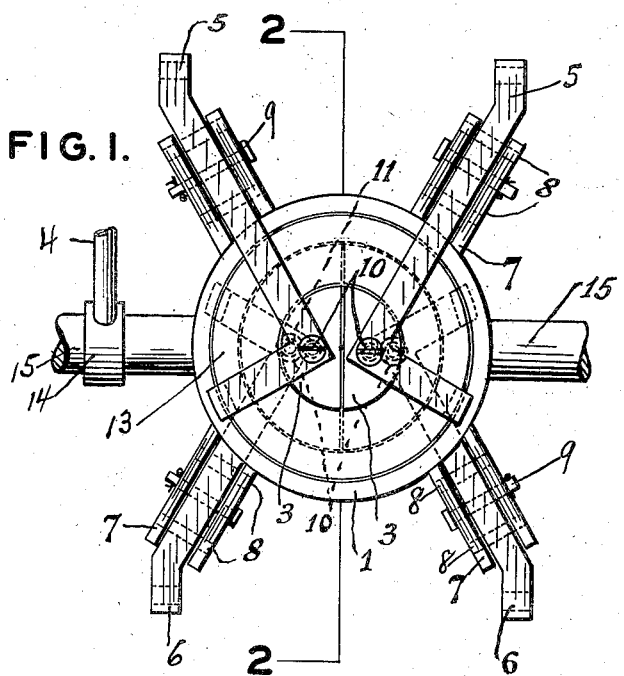
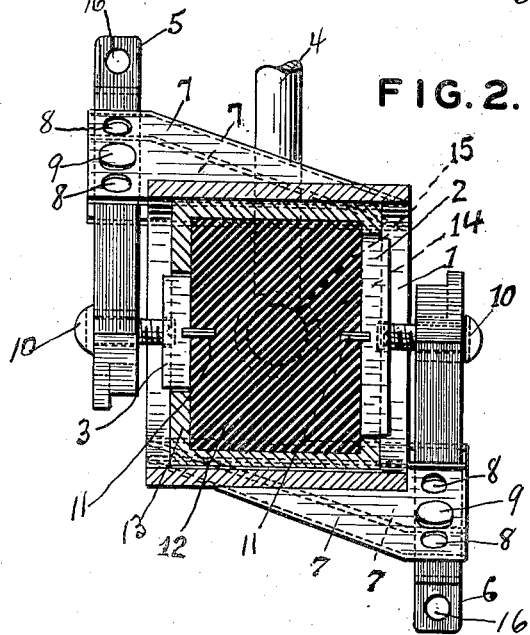
Frank Gough,
INVENTOR.
BY Loyal J. Miller,
ATTORNEYS.

Patented Aug. 21, 1934

1,970,696

UNITED STATES PATENT OFFICE 1,970,696

APPARATUS FOR AUTOMATICALLY EQUALIZING BRAKES

Frank Gough, Oklahoma City, Okla., assignor of one-third to W. H. Ferguson and one-third to C. E. Olander Application January 15, 1934, Serial No. 706,692

8 Claims. (Cl. 188—204)

My invention relates to automatic brake equalizing means, and particularly to the applying of brake power to the front pair of wheels of a vehicle and to the rear pair of wheels in desired different and relative proportions.

The prime object of my invention is to provide means of bringing brake apparatus to an adjustment even as relating to the right and left rear wheels and to the right and left front wheels in different degrees of applying power or brakes, and the further dividing of this pressure permitting the application of a greater amount of pressure to the front pair of wheels where that is desirable as is the case on practically all passenger cars.

A further object is to provide a device of the character described which will in addition to the application of pressure as above stated permit an equal amount of pressure to be applied to the separate front wheels, as related to each other, and an equal amount of pressure to be applied to the separate rear wheels, as related to each other.

Other objects of the invention are to provide a device and method of the class described which will be new, novel, practical and of utility; which may be constructed in a compact and economical manner; which will eliminate a great amount of expense now occasioned of periodically and frequently adjusting the vehicle brakes; which provides a complete mechanical linkage positively operable without danger to failure due to the escape of a mobile material, as is true of hydraulic brakes; which will eliminate many accidents caused at the present time due to improper adjustment of vehicle brakes; which will save a considerable amount of the wear on tires, because of the improper adjustment of the brakes; and which will be efficient in accomplishing all of purposes for which it is intended.

The invention consists substantially of a single hollow case of rigid construction pivotally mounted so that it may be partially rotated by a usual foot brake lever arm, and a second slidable case within said hollow case, a mobile or resilient material or a mobile and resilient material confined within the said inner case which is slidably mounted within said hollow case, practically filling the inner case, and a lever arm for each brake to be actuated, mounted on the case in such a manner that it is actuated when the case is partially rotated, only by contact with such material or substance. The mobile material may consist of many substances, for instance, certain kinds of rubber, molding clay, sand or other granular substances, or an envelope containing a liquid could be placed within the case and would function. It is preferable that the material be of such a nature that when it is once molded into a certain form it will have a tendency to remain in that form until sufficient pressure is brought to bear thereon to reform all or a portion of its body.

It is known to those familiar with the art that a greater amount of pressure or power is required to be applied for the effective stopping of the front wheels of the ordinary and usual motor vehicle than is required for the effective stopping of the rear wheels thereof. Some engineers claim that this relative power required on the ordinary and usual vehicle is approximately at the ratio of about five on the front pair of wheels to two on the rear pair of wheels. It is contended by those familiar with the art that the quick and effective applying of the brakes tends to make the front axle move backward under the chassis and thereby loosens the front brakes when one is trying to bring the car to a quick stop; and that such application causes the back axle to move backward from under the chassis thereby causing a greater application to the braking effect on the rear wheels. My device corrects this and divides the pressure between the respective front pair of wheels and the rear pair of wheels permitting the application of most of the pressure to the front wheels through the aid of linkage and piston areas and the variation of the sizes of the pistons, thereby neutralizing the ill effect of the chassis moving forward.

With these and other objects in view as will more fully appear, my invention consists in the construction, novel features, and combination of parts hereinafter more fully described, pointed out in the claims hereto appended, and illustrated in the accompanying one-sheet drawing, of which, Figure 1 is a rear vertical elevational view; and, Fig. 2 is a side vertical sectional view.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawing is to be interpreted as being illustrative and not restrictive.

The present application is presented as an improvement over my application for patent for an improvement in Brake equalizers, filed in the United States Patent Office December 1, 1933, under Serial No. 700,431, now Patent No. 1,962,989 issued June 12, 1934.

A description of the first mentioned embodiment of the invention follows:

The reference numeral 1 indicates a hollow open faced outer case or housing, preferably of metal, mounted for partial rotation on trunnions, not shown. An inside case 13 is slidably mounted within the outer case 1 and has open faces for the insertion of pistons therein, respectively; said inside case 13 and said pistons 2 and 3 completely close the open faces of said outer case 1 and are adapted to compress the mobile, or resilient material 12, confined therein; a semi-circular piston 2 bears on screw 10 which is connected to lever arm 6, there being an arm 6 for each front wheel, and a semi-circular piston 3 which bears on holding means 10 which is connected to lever arm 5, there being one arm 5 for each rear wheel. The piston 2 is of larger dimension than piston 3, as will be more fully hereinafter referred to. A brake pedal lever arm 4 leading to a brake pedal, not shown, is attached to shaft 15 by a collar, or the like, 14. Each of the adjustable brake lever arms 5 is mounted rigidly on holding means 10 and bears on piston 3 for actuating said semi-circular piston 3; and said arm 5 has a through-perforation 16 adjacent its outer end for connecting the brake rods, not shown. Intermediate its outer perforation 16 and holding means 10 are a plurality of holes 8 alined with like perforations 8 in a similar plurality of webs or hinges 7. A pin 9 is provided for insertion in a desired pair of coinciding holes 8 in said lever arm and said web or hinge 7. Each of the lever arms 5 and 6, as will be better seen in Fig. 1, is approximately L-shaped and are connected on said holding means 10 at the junction of the shorter and the longer portion of said L-shaped member. It will be noted that at each of the outer ends said longer member of said L is slightly bent to form a better angle for the connection with the brake rods, not shown.

The above description of said lever arms 5 is applicable to the lever arms 6 except that arms 6 are for the operation of the brakes on the two front wheels and operate the larger pair of semi-circular pistons 2, while lever arms 5 are for the operation of the brakes on the two rear wheels, and operate the smaller semi-circular pistons 3.

I also provide guide pins 11 for connecting the pistons 3 and 2 with the mobile or resilient substance 12, for stabilizing the motion of the semi-circular discs, or pistons.

The linkage as applied to the arms 5 and 6 may be shortened or lengthened as desired to accommodate the various requirements of the different makes and sizes of cars by placing the pin, or pins, 9 in the holes 8 in the respective arms and the respective webs or hinges 7, thereby increasing or decreasing the amount of pressure applied to the front or rear set of wheels. And in the same manner the relative proportion of brake pressure applied to the two front wheels, and to the two rear wheels may be made as desired. All of these results may be had without lengthening the arms, and without disconnecting them from the brake rod mechanism. The arms are so disposed that their general direction of extension from the center of said device is upwardly and outwardly and downwardly and outwardly.

In my device there is no chance of the brakes failing entirely to function due to the loss of mobile material, because if the material 12 was entirely removed from the inner case, the foot of the L-shaped member would come in contact with the outer case 1 which would limit and stop its movement in that direction and that would then cause the brakes to respond.

Operation

It will be apparent as probably best shown in Fig. 2 that any stress in the brake lever which connects to lever arm 5 at 16 will be transmitted in unequal magnitude to the brake rods which connect to lever arm 6 at 16 through a mobile substance 12 encased in inner case 13. It will also be apparent that like stress in the brake lever which connects to lever arm 6 will operate on lever arm 5 in the same relative manner.

When the brakes are suddenly applied the inertia of the body of the automobile tends to slacken the front brake lines and to tighten the rear ones thereby causing an unequal braking effect. This fault is corrected by the present apparatus by keeping the tension in the front and rear brake lines equal, and by applying a greater amount of pressure to the brake lines as applied to the front pair of wheels than that which is applied to the rear brake line on the rear wheels. With constant pressure on the brake pedal lever arm 4 the unequal tension in the front and rear brake lines is permitted to balance itself or equalize itself through the sliding action of the inner case 13 and the variation in the piston areas or sizes. In this effort the inner case 13 acts as a mechanical link between the lever arms 5 and 6 thereby allowing excessive stress on either end of the device to be transmitted to the other. This connection prevails through the application of any varying or constant pressure to the brake lever arm 4.

It will also be apparent that pins 11 tend to stabilize the motion of the pistons with relation to the mobile material.

Obviously, the invention is susceptible of embodiment in forms other than that which is illustrated in the accompanying drawing and described herein, and applicable, for uses and purposes other than as detailed, and I therefore consider as my own all such modifications and adaptations and other uses of the form of the device herein described as fairly fall within the scope of my invention.

Having thus described my invention, what is claimed and desired to be secured by Letters Patent, is:

1. In a device of the class described, a hollow outer case of rigid construction mounted for partial rotation, an inner case therewithin adapted for slidable movement in said outer case, a mobile material confined within said inner case, and operative connections in contact with the material and operated by the movement thereof for actuating a plurality of mechanical mechanisms when the case is partially rotated.

2. In a device of the class described, an actuating element, a plurality of independent actuated elements including an outer case and an inner slidable case therewithin, operative connections between the first element and each of the last elements, and means for causing the similar and simultaneous operation of the last mentioned elements when the first element is operated, said means including a mobile material confined within the inner slidable case and upon the shape and action of which material depends the relative movement of the operative connections.

3. In a device of the class described, a rigidly constructed hollow outer case mounted for partial rotation, a slidable inner case mounted therewithin, a plurality of lever arms each adapted for pivoting intermediate its ends to the outer case, having one of its ends bearing on a piston and one free end protruding therefrom, said free end each adapted to operatively connect separately operating brake mechanisms, and a mobile substance confined within the inner case, said substance acting as a means for regulating the relative distance the free ends of the arm may travel when the case is partially rotated.

4. In a device of the class described, a rotatably mounted outer case, a slidable inner case therewithin, a mobile material within the inner case, and levers carried by the outer case, said levers bearing on a pair of pistons which contact with the material, and the respective movements thereof being governed by the form and action of the material.

5. In a device of the class described, a rotatably mounted outer case, a slidable inner case therewithin, a mobile material within the inner case, a pair of pistons contacting said material carried by the inner case, and levers carried by the outer case, said levers being in contact with the material, and the respective movements thereof being governed by the form and action of the material.

6. In mechanism for automatically governing the extent of movement of a plurality of levers, an outer case, an inner slidable case, a mobile material confined within the inner case and a plurality of levers carried by the outer case and limited in their movement by the shape and action assumed by the mobile material.

7. In mechanism for automatically governing the extent of movement of a plurality of levers, an outer case, a slidable inner case, a mobile material confined within the inner case and means carried by each lever for contacting the material and thereby governing the extent of movement of the levers with relation to each other.

8. In a device of the class described, a rotatably mounted outer case, a slidable inner case therewithin, a mobile material within the inner case, levers carried by the outer case, said levers bearing on a pair of pistons which contact with the material, the respective movements thereof being governed by the form and action of the material, and means for adjusting the fulcrum upon which said lever arms are moved.

FRANK GOUGH.